(12) United States Patent
    Gore

(10) Patent No.: US 11,020,881 B2
(45) Date of Patent: Jun. 1, 2021

(54) SYSTEM AND METHOD FOR PRESSURE CONTROL OF TIRE CURING PRESS

(71) Applicant: Teddy Gore, Puryear, TN (US)

(72) Inventor: Teddy Gore, Puryear, TN (US)

(*) Notice: Subject to any disclaimer, the term of this patent is extended or adjusted under 35 U.S.C. 154(b) by 100 days.

(21) Appl. No.: 16/524,376

(22) Filed: Jul. 29, 2019

(65) Prior Publication Data

US 2020/0031025 A1    Jan. 30, 2020

Related U.S. Application Data

(60) Provisional application No. 62/711,152, filed on Jul. 27, 2018.

(51) Int. Cl.
*B29D 30/06* (2006.01)
*B29C 35/02* (2006.01)
*B29L 30/00* (2006.01)

(52) U.S. Cl.
CPC .......... *B29C 35/02* (2013.01); *B29D 30/0654* (2013.01); *B29D 30/0662* (2013.01); *B29L 2030/00* (2013.01)

(58) Field of Classification Search
CPC ............ B29D 30/0603; B29D 30/0654; B29D 30/0662; B29D 2030/0666; B29D 2030/0667; B29D 2030/0675
See application file for complete search history.

(56) References Cited

U.S. PATENT DOCUMENTS

| 5,240,669 A * | 8/1993 | Kobayashi | B29D 30/0662 264/315 |
| 8,414,278 B2 * | 4/2013 | Okada | B29D 30/0601 425/42 |
| 9,987,812 B2 * | 6/2018 | Kitai | B29C 33/04 |
| 2010/0007038 A1 * | 1/2010 | Mitamura | B29C 35/007 264/40.3 |
| 2013/0062803 A1 * | 3/2013 | Mizuta | B29C 35/007 264/40.1 |

FOREIGN PATENT DOCUMENTS

| JP | 09-76239 | * 3/1997 |
| JP | 2011-143585 | * 7/2011 |

* cited by examiner

*Primary Examiner* — James P Mackey
(74) *Attorney, Agent, or Firm* — Dunlap Bennett & Ludwig, PLLC; Anna Kinney

(57) ABSTRACT

A system for maintaining low pressure within a tire press bladder when the press is open and controlling pressure by using an orifice on the supply line side of the tire press bladder. The supply line runs from a high-pressure supply media to a tire press bladder. A three-way valve alternates in directing high pressure directly through the supply line and directing high pressure to an orifice. Simultaneously the pressure in the bladder is controlled by a regulating valve on the drain side piping. When the press is closed on a tire, the three-way valve supplies high pressure from the supply line directly to the tire press bladder.

10 Claims, 1 Drawing Sheet

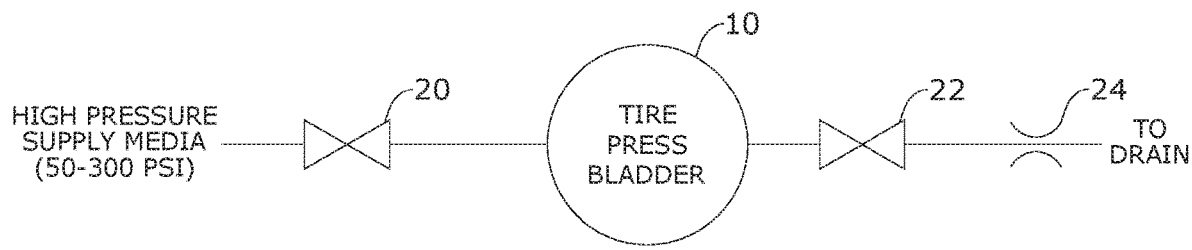

FIG.1
(PRIOR ART)

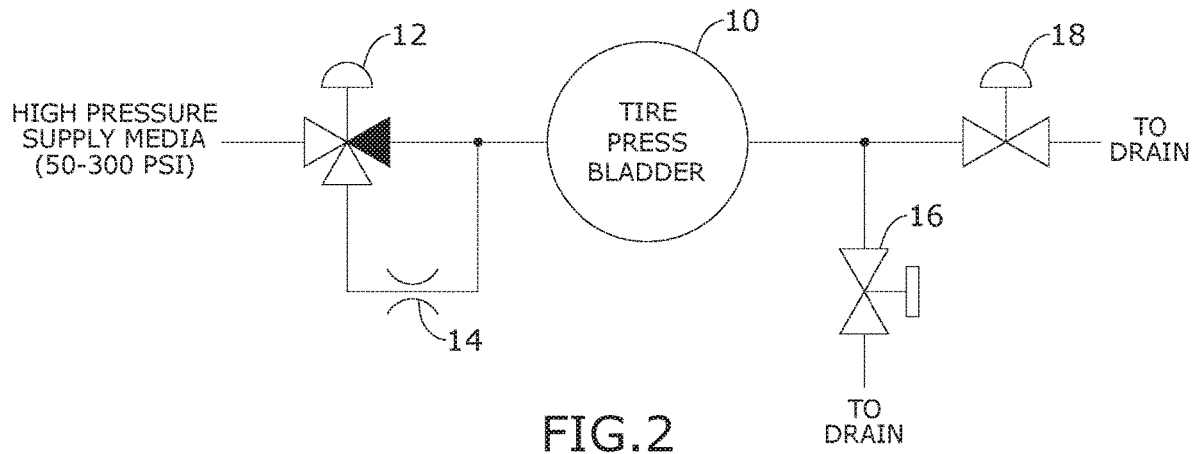

FIG.2

| THE ORIFICE RESTRICTS FLOW AND IS THE COMPONENT THAT SEES THE HIGH-PRESSURE DIFFERENTIAL ON THE INLET SIDE |
|---|
| THE CONTROL VALVE TAKES THE RESTRICTED FLOW ON THE OUTLET SIDE AND REGULATES THE PRESSURE IN THE BLADDER |
| A CONTROLLER SENSES THE PRESSURE IN THE BLADDER, AND IF THE PRESSURE DOES NOT MATCH A PROGRAMMED SET POINT, THE CONTROL VALVE IS POSITIONED ACCORDINGLY TO ACHIEVE THE SET POINT |

FIG.3

SYSTEM AND METHOD FOR PRESSURE CONTROL OF TIRE CURING PRESS

CROSS-REFERENCE TO RELATED APPLICATION

This application claims the benefit of priority of U.S. provisional application No. 62/711,152, filed Jul. 27, 2018, the contents of which are herein incorporated by reference.

BACKGROUND OF THE INVENTION

The present invention relates to tire curing and, more particularly, to a system and method for pressure control of a tire curing press.

Pneumatic tires are manufactured according to relatively standardized processes and machinery. With over 1 billion tires manufactured worldwide annually, the tire industry is the major consumer of natural rubber. Tire factories start with bulk raw materials such as synthetic rubber (60%-70% of total rubber in the tire industry), carbon black, and chemicals and produce numerous specialized components that are assembled and cured.

The tire is an assembly of numerous components that are built up on a drum and then cured in a press under heat and pressure. Heat facilitates a polymerization reaction that crosslinks rubber monomers to create long elastic.

Curing is the process of applying pressure to the tire in a press in order to give it its final shape and applying heat energy to stimulate the chemical reaction between the rubber and other materials. In this process the tire is transferred onto the lower press bead seat and a rubber bladder is inflated inside the tire. The inflated bladder grips the uncured tire and allows the tire loader to release the tire and move away. Low pressure in the bladder is held or increased while the press remains open. When the press closes and is locked, the bladder pressure increases and presses the tire into the press such that the tire takes on the tread pattern and sidewall lettering engraved into the press. The bladder is filled with a higher-pressure medium, such as steam, hot water, inert gas, or nitrogen gas. Temperatures are in the area of 350 degrees Fahrenheit with pressures around 350 PSI.

Passenger tires cure in approximately 16 minutes. At the end of cure the pressure is bled down, the press opened, and the tire stripped out of the press. The tire may be placed on a PCI, or post-cure inflator, that holds the tire fully inflated while it cools.

To deliver high pressure to the tire press bladder, a high-pressure supply media delivers pressure through a supply line and supply side valves. When the press is opened, the supply valves stop the pressure from entering the tire press bladder until another tire is loaded into the press. At that time a modulating or regulating valve controls the low pressures that are needed while the press is open. This creates a high-pressure differential across the modulating or regulating valves of the system. The high-pressure differential causes wear and tear on the valves and makes the system difficult to control precisely. This leads to which leads to tire quality problems and premature valve failures.

As can be seen, there is a need for an improved system and method for pressure control of a tire curing press.

SUMMARY OF THE INVENTION

In one aspect of the present invention, a system of regulating pressure comprises: a supply line running from a high-pressure supply media to a tire press bladder; a secondary line running from the high-pressure supply media and to the tire press bladder, wherein the secondary line comprises an orifice; and a valve system configured to alternate in directing high pressure from the high-pressure supply media directly through the supply line and directing high pressure from the high-pressure supply media to the secondary line, wherein when a press is closed on a tire, the valve system supplies high pressure from the supply line directly to the tire press bladder, and when the press is opened, the valve system directs high pressure to the secondary line.

In another aspect of the present invention, a method of controlling pressure inside a tire press bladder of a tire curing press comprises steps of: directing a high pressure from a high-pressure supply media through a secondary line comprising an orifice, and into a tire press bladder via a valve system when a press is open; loading an uncured tire into a press so that the tire press bladder is disposed within the uncured tire; and directing the high pressure from the high-pressure supply media through a supply line directly to the tire press bladder via the valve system when the press is closed.

These and other features, aspects and advantages of the present invention will become better understood with reference to the following drawings, description and claims.

BRIEF DESCRIPTION OF THE DRAWINGS

FIG. 1 is a schematic view of prior art;
FIG. 2 is a schematic view of an embodiment of the present invention; and
FIG. 3 is a flow chart of an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

FIG. 1 is a schematic view of a prior art system of regulating pressure. The prior art includes a high pressure media delivering high pressure through a supply line to a tire press bladder 10. The supply line includes a regulating valve 20 to control the pressure within the tire press bladder 10. A drain line runs from the tire press bladder to provide an exhaust for the pressure. A two-way valve 22 and an orifice 24 are coupled to the drain line. When a press is open, the regulating valve 20 restricts the pressure from entering the tire press bladder 10, which causes a high-pressure differential across the control valves of the system. The high-pressure differential causes wear and tear on the regulating valve 24, which leads tire quality issues and premature valve failures.

FIG. 2 illustrates the system of the present invention. The system of the present invention regulates pressure within the tire press bladder 10. The system includes a supply line running from a high-pressure supply media to a tire press bladder 10. A secondary line runs from the high-pressure supply media and to the tire press bladder 10. The secondary line includes an orifice 14. In orifice 14 is defined as a narrowing of the bore at a portion of the secondary line, i.e. the orifice 14 portion of the secondary line has a smaller diameter internal bore than a remaining portion of the secondary line. A valve system 12 is configured to alternate in directing high pressure from the high-pressure supply media directly through the supply line and directing high pressure from the high-pressure supply media to the secondary line. When a press is closed on a tire, the valve system 12 supplies high pressure from the supply line directly to the tire press bladder 10. When the press is opened, the valve system 12 directs high pressure to the secondary line.

In certain embodiments, an inlet and an outlet of the secondary line are fluidly connected to the supply line. For example, the secondary line runs from the supply line and back to the supply line. In such embodiments, the valve system 12 is a three-way valve coupled at the inlet of the secondary line and configured to alternate in directing high pressure directly through the supply line and directing high pressure to the secondary line.

The present invention further includes a drain line running from the tire press bladder 10 to exhaust pressure. The drain line includes a main drain line and a secondary drain line running from the main drain line. A two-way valve 18 is coupled to the main drain line beyond the secondary drain line, and a regulating valve 16 coupled to the secondary drain line. When the press is open, the two valve 18 is held closed and flow is directed to the regulating valve 16. The regulating valve controls the pressure in the bladder.

FIG. 3 is a flow chart of a method of controlling pressure inside a tire press bladder of a tire curing press. The method may include the following steps: directing a high pressure from a high-pressure supply media through a secondary line comprising an orifice, and into a tire press bladder via a valve system when a press is open; loading an uncured tire into a press so that the tire press bladder is disposed within the uncured tire; and directing the high pressure from the high-pressure supply media through a supply line directly to the tire press bladder via the valve system when the press is closed. The present invention further includes the steps of: opening the press; exhausting the pressure from the tire press bladder via a main drain line and a two-way valve; and maintaining a low pressure within the tire press bladder by a regulating valve of a secondary drain line. In embodiments when the secondary line runs from the supply line and back to the supply line, and the valve system is a three-way valve configured to alternate in directing high pressure directly through the supply line and directing high pressure to the secondary line, the present invention includes the step of directing the high pressure from the high-pressure supply media through the supply line, through the secondary line and the orifice, back to the supply line and into the tire press bladder via the three way valve after the press is opened and another tire is loaded.

It should be understood, of course, that the foregoing relates to exemplary embodiments of the invention and that modifications may be made without departing from the spirit and scope of the invention as set forth in the following claims.

What is claimed is:

1. A system of regulating pressure comprising:
 a supply line running from a pressurized media supply to a tire press bladder;
 a secondary line running from the pressurized media supply and to the tire press bladder, wherein the secondary line comprises a flow restrictor; and
 a valve system configured to alternate in directing a pressurized media having a pressure of at least 50 pounds per square inch (PSI) from the pressurized media supply directly through the supply line and directing the pressurized media from the pressurized media supply to the secondary line, wherein
 when a press is closed on a tire, the valve system supplies the pressurized media from the supply line directly to the tire press bladder, and
 when the press is opened, the valve system directs the pressurized media to the secondary line.

2. The system of claim 1, further comprising a drain line running from the tire press bladder.

3. The system of claim 2, wherein the drain line comprises a main drain line and a secondary drain line running from the main drain line.

4. The system of claim 3, further comprising a two-way valve coupled to the main drain line beyond the secondary drain line, and a regulating valve coupled to the secondary drain line.

5. The system of claim 4, wherein the two-way valve is initially opened to exhaust pressure once the tire is cured and then the regulating valve maintains a pressure lower than 50 PSI within the tire press bladder when another tire is loaded into the press.

6. The system of claim 1, wherein the secondary line runs from the supply line and back to the supply line, and the valve system is a three-way valve configured to alternate in directing the pressurized media directly through the supply line and directing the pressurized media to the secondary line.

7. A method of controlling pressure inside a tire press bladder of a tire curing press comprising steps of:
 directing a pressurized media having a pressure of at least 50 PSI from a pressurized media supply through a secondary line comprising a flow restrictor, and into the tire press bladder via a valve system when the tire curing press is open;
 loading an uncured tire into the tire curing press so that the tire press bladder is disposed within the uncured tire; and
 directing the pressurized media from the pressurized media supply through a supply line directly to the tire press bladder via the valve system when the tire curing press is closed.

8. The method of claim 7, wherein the secondary line runs from the supply line and back to the supply line, and the valve system is a three-way valve configured to alternate in directing the pressurized media directly through the supply line and directing the pressurized media to the secondary line.

9. The method of claim 7, further comprising steps of:
 opening the tire curing press; and
 exhausting the pressure from the tire press bladder via a main drain line and a two-way valve.

10. The method of claim 8, further comprising steps of:
 directing the pressurized media from the pressurized media supply through the supply line, through the secondary line and the flow restrictor, back to the supply line and into the tire press bladder via the three way valve after the tire curing press is opened and another tire is loaded; and
 maintaining a pressure below 50 PSI within the tire press bladder by a regulating valve of a secondary drain line.

\* \* \* \* \*